Jan. 29, 1963   F. RICHTER   3,076,173
ECHO SOUNDING APPARATUS
Filed Nov. 19, 1958   4 Sheets-Sheet 1

Jan. 29, 1963  F. RICHTER  3,076,173
ECHO SOUNDING APPARATUS
Filed Nov. 19, 1958  4 Sheets-Sheet 4

INVENTOR
FRIEDRICH RICHTER

United States Patent Office 3,076,173
Patented Jan. 29, 1963

3,076,173
ECHO SOUNDING APPARATUS
Friedrich Richter, Schleswig-Holstein, Germany, assignor to Electroacustic Gesellschaft mit beschränkter Haftung, Kiel, Germany, a corporation of Germany
Filed Nov. 19, 1958, Ser. No. 774,858
22 Claims. (Cl. 340—3)

My invention relates to echo sounding apparatus in which the periodically recurring moment of sonic pulse transmission can be shifted continuously with respect to the likewise periodic motion of a stylus travelling across the writing surface of a recorder.

Echo sounders of this type are known wherein the recording range of the recorder can be set to correspond not to the total tracking range available but to only a selected partial range in order to better reveal any details within the partial range than can otherwise be ascertained from a full-range record. In one known echo sounder of this type, the stylus passes twice across the recording tape surface in the time interval elapsing between each two consecutive transmissions of sounding pulses, but the stylus is permitted to record an echo only during one of the two passages. The sounder is further equipped with a device for continuously shifting the periodically recurring moment of sonic pulse transmission relative to the cycle period that corresponds to the total sounding range. The periodic release of the sonic pulse is effected by a rotating cam actuating an electric contact, the cam shaft being driven by the same drive that imparts travel motion to the stylus; and the above-mentioned shifting of the pulse releasing moment relative to the stylus travel cycle is effected by turning the cam relative to its drive shaft so as to delay or advance the periodic actuation of the pulse contact.

It is an object of my invention to further improve an echo sounder generally of the above-mentioned type by affording a continuous and more accurate shifting of the pulse transmitting movement during continuing operation of the echo sounder. Another object is to devise a recording echo sounder which, aside from producing a record of the sonic observations, indicates on the same record surface the particular partial range being sounded and recorded at a time.

To achieve these objects, and in accordance with a feature of my invention I provide an echo sounding apparatus generally of the above-mentioned type with a driving transmission which connects the transmitter-pulse releasing device with the drive for the recorder stylus and which comprises a train of intermeshing gears of which one, aside from being rotatable for transmission of driving motion to the releasing device, is displaceable relative to an adjacent gear of the train so as to vary the recurrent releasing moment of the pulse-releasing device relative to the cyclical travel of the stylus.

According to one of the more specific features of my invention, the above-mentioned gear train comprises a worm gearing in which a revolvable worm member meshes with a worm gear and is axially displaceable relative to the worm gear in order to shift the phase of worm rotation relative to that of the worm gear.

According to an alternative embodiment of my invention, the above-mentioned gear transmission is generally of the differential type and consists preferably of a planetary gearing in which a normally stationary sun or orbit gear is rotatably displaceable for effecting the above-mentioned time shifting of the pulse releasing moment.

According to still another, preferred feature of the invention, an echo sounder with a recorder and a gear transmission as outlined above is also provided with a cathode ray oscillograph tube whose sweep circuit can be released at a selected moment within the pulse-transmitting cycle so as to produce on the viewing screen of the tube a magnified image of a partial range that can be shifted at will within the total sounding range available, such echo sounders being known as such from U.S. Patent 2,788,509 of H. Bolzmann assigned to the assignee of the present invention. However, according to the present invention, the releasing device for the sweep generator of the indicator tube is also connected with the stylus drive of the recorder by a gear transmission in which one of the intermeshing gears is displaceable relative to another one to effect the desired continuous shifting of the magnified partial range shown on the viewing screen of the tube, relative to the sounding range indicated by the stylus of the recorder.

According to another feature of my invention, a film strip, carrying a scale of depth-denoting indicia, extends across the recording surface of the recorder and is displaceable together with the displacement of the pulse-releasing moments effected by the above-mentioned gear transmission, so that the sounding depth can be read off the scale on the film strip when viewing the recorded echo signals.

According to still another feature of the invention, a contact mechanism is connected with the device for the continuous shifting of the recurrent momement of pulse transmission so as to be adjustable simultaneously with the shifting of that moment; and the said contact mechanism is electrically connected with the stylus of the recorder in order to cause it to produce distance-denoting reference marks on the recording tape which identitfy the particular partial range being recorded at a time. An echo sounder embodying this feature has the advantage of requiring no additional marking device for identifying the partial range, because the same stylus that records the received signals is also used for producing such distance-identifying marks.

The foregoing and other objects, advantages and features of my invention will be apparent from, and will be described in, the following with reference to the embodiments of echo sounders according to the invention exemplified on the accompanying drawings in which:

FIGS. 6 and 7 are an axial view and side view respectively of a modified portion of such a mechanism.

Figure 1:
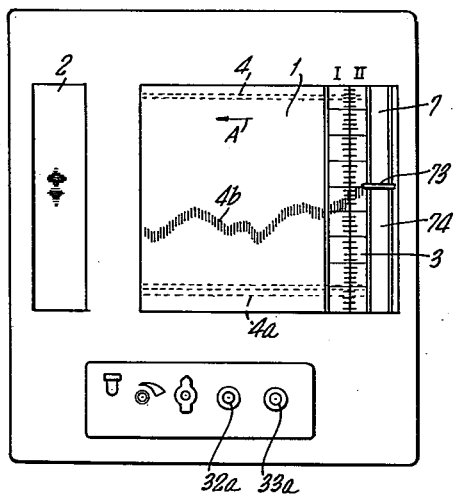
FIGS. 1 and 2 are front views of the apparatus showing respectively different recordings on the recording tape of the receiving recorder.

Referring first to the diagram of FIG. 8, the overall organization and performance of the echo sounder according to FIGS. 1 to 5 will be described.

The echo sounder comprises a sonic pulse transmitter TR connected to an electric pulse generator PG. The transmitter TR may be designed as a magnetostrictive transducer to operate in or near the ultrasonic range. A receiver RC, which may also consist of a magnetostrictive transducer, is connected to a signal amplifier AM. One output circuit of amplifier AM is connected with the writing device of a recording instrument RE. Another output circuit of amplifier AM is connected to the horizontally spaced deflector electrodes of a cathode-ray picture tube PC. A sweep generator SG is connected to the vertically spaced deflector electrodes of tube PC for placing the tube in receptive condition by issuing a saw-tooth sweep voltage in response to a trigger pulse applied to the input circuit of the sweep generator SG from a contact device controlled by a rotating cam 17.

The recorder RE is provided with a surface member 1 consisting of a recording tape of paper which travels between rollers 71 and 72 in the direction of the arrow A. The rollers are driven from an electric motor M through a suitable transmission schematically represented at 11b. While the tape 1 advances at uniform speed, a stylus 73 travels periodically across the tape surface at uniform speed. During such transverse travel of stylus 73, it produces recording marks on the paper tape under control by voltage pulses applied from amplifier AM across roller 71 and stylus 73. The recording tape 1 is electro-responsive so that the voltage pulse causes a dot to appear on the record surface thus producing a sequence of recording marks such as shown at 4b.

The stylus 73 is mounted on an endless carrier 74 consisting of a chain or belt which extends about two sheaves or sprockets 75 and 76. Sprocket 76 is driven at uniform speed from motor M by the above-mentioned transmission 11b. The stylus 73 has a brush contact which slides along a contact bar 77 as the stylus travels across the recording tape 1.

When the receiver RC responds to an echo of a pulse issued by the transmitter TR, a correspondingly amplified voltage is impressed by amplifier AM between stylus 73 and roller 71 thus producing a dot on the tape 1 as mentioned above. During each of the consecutive cycles of stylus travel, two such dots may be produced. One dot appears at the recurrent moment when the receiver RC responds to a pulse issuing from the transmitter TR under control by a contact device actuated by a cam 5. Thus a normally straight zero line, or a group of such lines, is produced at 4 on tape 1. At the moment when an echo is received by receiver RC, another dot is produced during each stylus passage, and this dot appears on the tape at a distance from the zero line 4. The echo dots may form together one or several curves such as the one denoted by 4b.

During the above-described operation an image of the received echo pulses is simultaneously produced on the viewing screen 2 (FIGS. 1, 2) of the picture tube PC. This image, as will be more fully explained below, represents a selected partial range cutout of the greater or total sounding range recorded by the recorder RE.

The contact device controlled by cam 5 for issuing a pulse from the pulse generator PG to the transmitter TR, and the contact device controlled by cam 17 for triggering the sweep generator SG are both connected with the drive for the stylus 73 so that the respective releasing pulses are issued in synchronism with the cyclical recording travel of the stylus.

However, these moments can be shifted independently of each other with respect to the travel cycle of the stylus by means of the gear transmissions provided between the stylus drive and the releasing devices and described presently. As a result, the recorder RE and the cathode ray tube can be individually controlled so that the ranges or partial ranges indicated by them are located either at the same or at different places of the total sounding range available.

Figure 2:
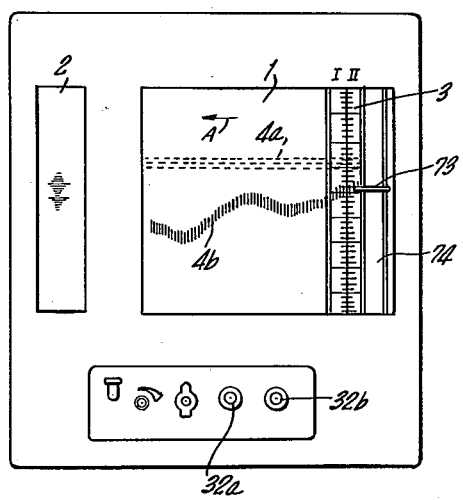

As shown in FIGS. 1 and 2, the recording surface of the paper tape 1 and the viewing screen 2 of the picture tube are preferably located beside each other so that they can be observed simultaneously. Extending above and across the recording surface 1 is a film strip 3 which carries a scale of indicia calibrated in units of distance or depth such as meters or feet. The film strip 3 is displaceable at a right angle to the advancing direction A of the tape. The film strip is displaced together with any change in the setting of the selected partial range under observation so as to afford reading at any time the sounded distance or depth from the record. The above-mentioned reference marks 4, consisting of straight lines parallel to the travelling direction A of the tape, are given a certain characteristic appearance from which the particular partial range being recorded is apparent. To this end, some of the lines may be single lines whereas others are double lines, triple lines and so forth. For example, triple lines are shown at 4a (FIG. 2) as indicative of a certain selected partial sounding range. How these differentiating reference marks are produced will be explained further below. The distance of the recorded echo signals 4b from one of the reference lines 4 or 4a accurately indicates the measured value of distance or depth. As a result, the records produced by the recorder are subsequently available and fully interpretable at any time.

The viewing screen 2 of the cathode ray tube PC indicates the instantaneous response of the echo sounder on a larger scale so that the shape of the indicated images permits a conclusion as to the type or shape of the objects being tracked.

The above-mentioned shifting of the moment of pulse transmission by transmitter TR (FIG. 8) relative to the travel cycle of the writing stylus is effected by means of a worm gearing which is driven from the stylus drive and actuates the above-mentioned cam disc 5. Located at the periphery of disc 5 and controlled thereby are two switch contacts 6 and 7 (FIGS. 3, 5, 8, 9). Mounted on shaft 8 of cam 5 is a worm gear 9 meshing with a worm 10 (FIGS. 3, 4, 5, 8, 9). The shaft 11 of worm 10 is connected with the stylus drive as is schematically indicated in FIG. 8 at 11a. Worm shaft 11 carries a spur gear 12 meshing with another spur gear 13 of the same diameter (FIGS. 5, 9). Mounted on shaft 14 of spur gear 13 is another worm 15 (FIGS. 4, 5, 9) which is a duplicate of worm 10. Worm 15 meshes with a worm gear 16 which is a duplicate of worm gear 9 and whose shaft 8a carries the above-mentioned cam 17 which, like cam 5, actuates two contacts 18 and 19 (FIGS. 5, 8, 9). Contacts 18 and 19 serve for triggering the sweep generator SG (FIG. 8) which places the picture tube PC in receptive condition.

Each of the two worms 10 and 15, though not rotatable relative to the appertaining drive shaft 11 or 14, can be displaced in the axial direction of the shaft. Such displacement is effected by means of respective racks 20 and 35 (FIGS. 3, 4, 9) of which the rack 20 for worm 10 is best apparent from FIG. 3. Any axial displacement of the worm 10 or 15 has the effect of turning the cam 5 or 17 relative to the coordinated contacts 6, 7 or 18, 19 so that the recurrent moment of pulse transmission, or the recurrent triggering moment of the sweep generator, is shifted relative to the travel cycle of the recorder stylus.

Mounted on shaft 8 of cam 5 is a contact drum 21 (FIGS. 4, 5, 8, 9) which carries several groups of parallel metal bars 22 to cooperate with pairs of contact springs 23, 24 and 25 thus temporarily closing the circuit of one of the respective contact pairs at a time. The respective groups have different numbers of contact bars and are angularly displaced 60° relative to one another. The number of metal bars per group increases from one to five. That is, the smallest group has only one contact bar, the largest group five such bars. The angle between the one-bar group and the five-bar is 120°. The length of the metal bars is such that the individual groups do not overlap each other, seen in the axial direction of the drum 21.

The individual contact springs of the pairs 23 to 25 are longitudinally displaceable relative to each other by means of screws 23', 24', 25' (FIG. 9). All contact pairs are mounted on a slider 26 (FIGS. 4, 5, 9) which is displaceable parallel to the rotation axis of drum 21. Slider 26 is step-wise displaced by means of a stepping mechanism consisting of a drum 27 with a stepped guiding groove 38 engaged by a projection of slider 26. The same stepping mechanism actuates an interrupter contact 28' (FIG. 5) which is opened only when the slider 26 is in a limit position where the zero-echo mentioned above, is being recorded on the recording tape. This is the case when the chosen sounding range shown on recorder RE (FIG.

8) is such that the zero signal, namely the direct signal received by the receiver RC at the moment when the signal is being issued by the transmitter TR, causes the stylus to produce a mark on the recording tape. Then, as explained, the signal will automatically produce a zero line (4 in FIG. 8) on the recording tape so that it is not necessary to have the contact drum 21 and the contact pairs 23 to 25 enter into recording operation. It will be understood that when any other sounding range is chosen in which the stylus commences its travel across the recording tape at a moment subsequent to the issuance of the sonic pulse by the transmitter TR, the recording drum and the contact pairs are operative to produce the above-mentioned identifying reference lines (4, 4a in FIGS. 1, 2) onto the tape surface, thereby indicating which particular partial range is being recorded.

Also mounted on shaft 8 of contact drum 21 and cam 5 is a worm 28 (FIGS. 4, 5, 9) which meshes with a worm gear (FIG. 9) coaxially joined with a cam 30 for actuating another interrupter contact 29. Interrupter contact 29 is placed into operation, by manual actuation of a selector switch 29' (FIG. 8), when it is desired to have broken marker lines entered on the recording tape instead of continuous lines. Such interrupted marker lines are preferable in cases where the curve of the recorded echo signal coincides with the marker lines.

Figure 3:
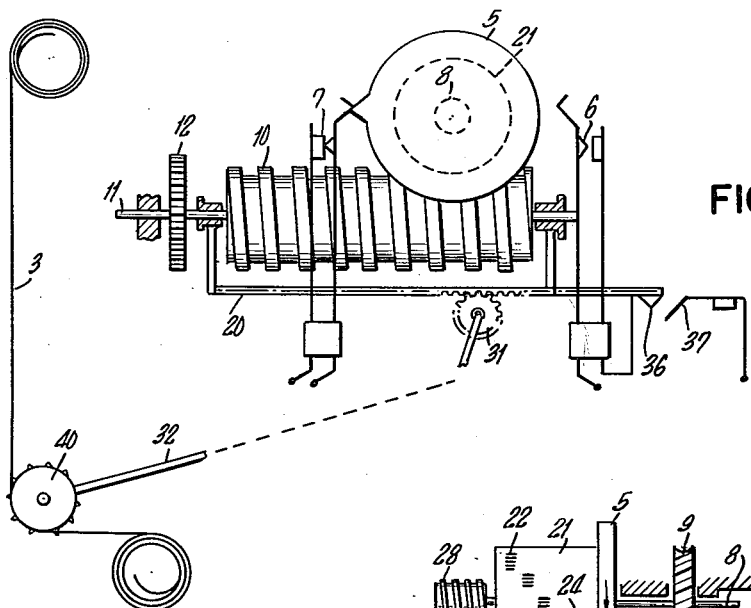
FIGS. 3, 4 and 5 are schematic diagrams of the mechanisms that transmit driving motion from the paper-feed drive of the recorder to the devices for releasing the transmitter pulse and triggering the sweep generator of the picture tube.
Figure 4:
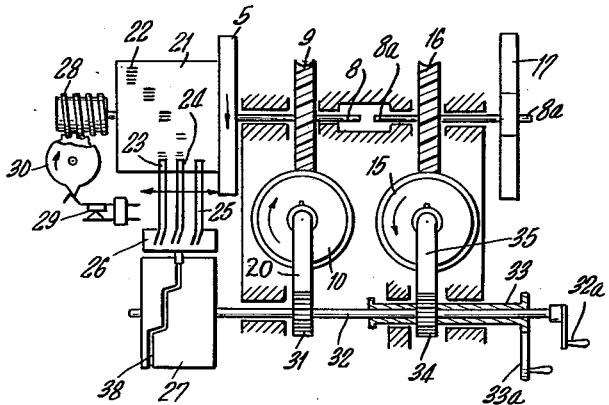
Figure 5:
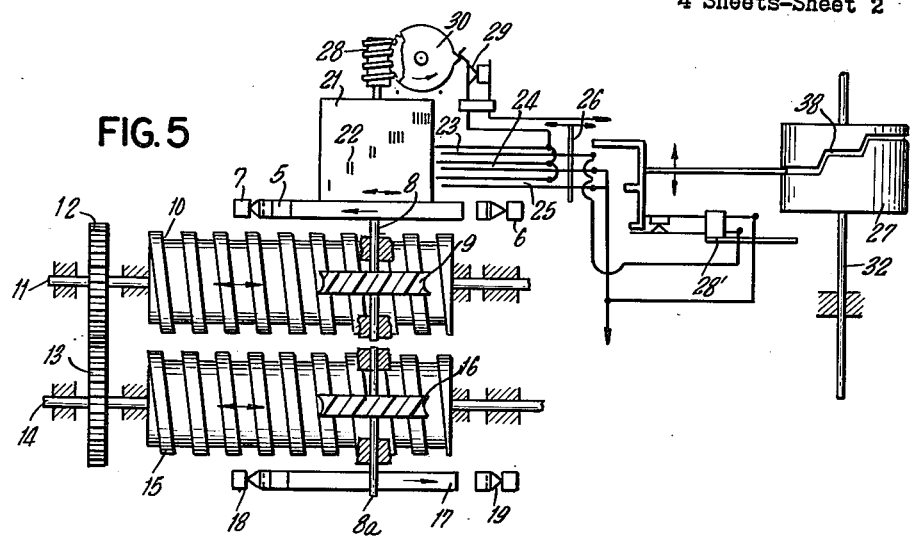

The above-mentioned rack 20 for displacing the worm 10 meshes with a pinion 31 (FIGS. 3, 4, 9) on a shaft 32 which is provided with a knob 32a (FIGS. 1, 2, 9) schematically illustrated as a handle in FIG. 4. By means of the manual control member 32a the shaft 32 with pinion 31 can be turned to displace rack 20 and worm 10 in the axial direction. Shaft 32 passes through a hollow shaft 33 which carries another manual control member 33a (FIGS. 4, 1). Mounted on hollow shaft 33 is a pinion 34 of the same diameter as the pinion 31. Pinion 34 meshes with the rack 35 for axially displacing the worm 15. Such axial displacement of worm 15 has the effect of angularly displacing the shaft 8a of cam 17, thus turning cam 17 relative to the contacts 18 and 19 for advancing or delaying the moment at which the sweep generator SC (FIG. 8) is triggered and the picture tube PC placed into ready condition.

One end of each of the two racks 20 and 35 carries an electric contact as shown at 36 for rack 20 (FIG. 3). Contact 36 is engageable with a stationary spring contact 37 (FIGS. 3, 8) only when rack 20 and hence cam 5 are set for sounding operation within the lowermost portion of the total sounding range. However, if worm 10 or worm 15 is shifted relatively far toward the left with reference to FIG. 3, then the contact 36 becomes disengaged from the counter contact 37 (FIGS. 3, 8) or 37a (FIG. 8) so that the contacts 6 (FIGS. 3, 8, 9) or 19 (FIGS. 5, 8, 9) are made inactive. This has the result that for each individual rotation of cam 5 only one transmitter pulse is released by contact 7, and that for each full revolution of cam 17 the sweep generator is triggered only once by contact 18.

The above-mentioned stepping mechanism, constituted by the drum 27 (FIGS. 4, 9), is mounted on the control shaft 32 for worm 10 and cam 5. The control groove 38 in drum 27 which incrementally displaces the slider 26 of the contact pairs 23 to 25 has such a position and shape that the slider 26 is shifted stepwise whenever the marker line (4 or 4a in FIGS. 1, 2) previously recorded on the tape and identifying as a recording area a given section of the total sounding range, travels out of the recording area or surface range of the tape 1. Thus FIG. 2 relates to a condition in which the reference lines 4 of FIG. 1 have travelled upwardly off the tape 1 out of the recorded range so that the lower group of reference lines 4a is the only one visible on the recording tape.

Figure 8:
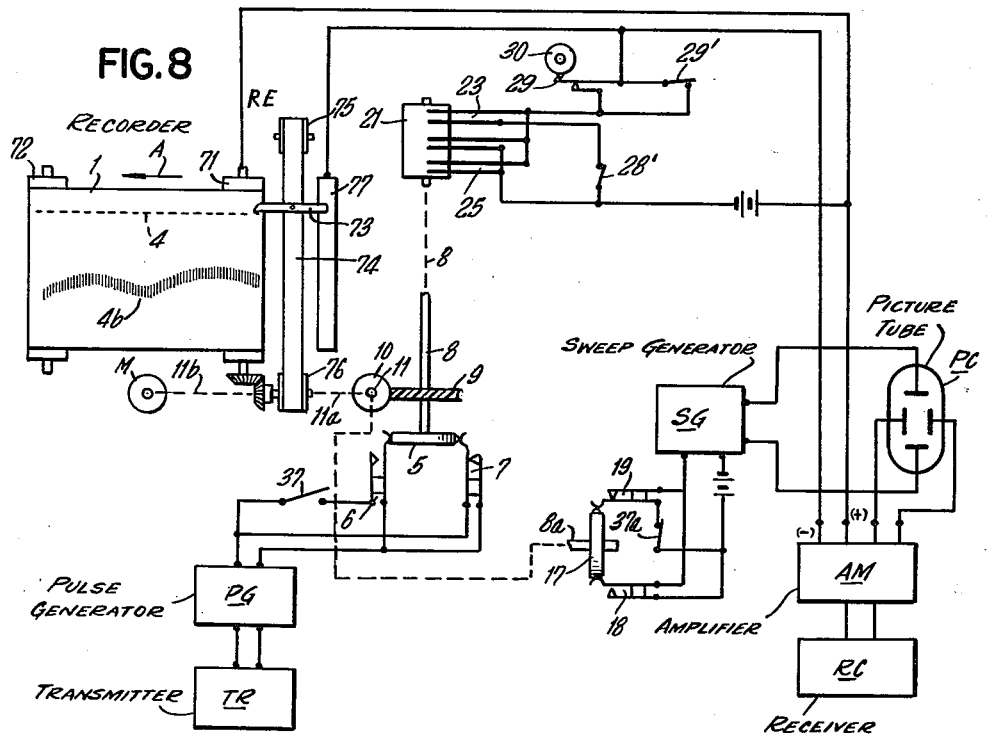
FIG. 8 is a schematic circuit diagram of an echo sounding apparatus as illustrated in FIGS. 1 through 5.
Figure 9:
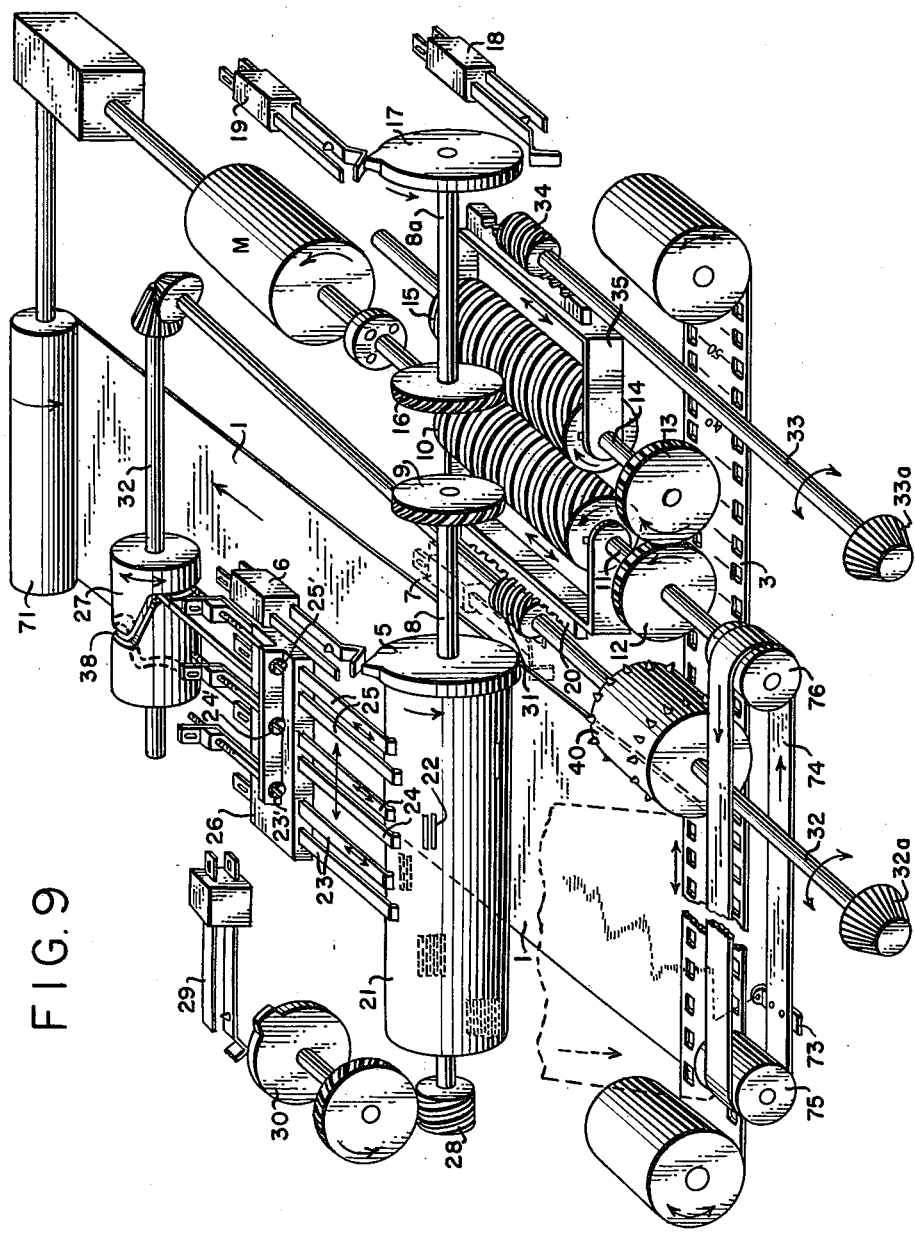
FIG. 9 is a perspective view of the entire apparatus according to the embodiment of FIGS. 1–5.

As shown in FIG. 8, the contact pairs 23 to 25 are connected, together with a current source, in the control circuit of the recording stylus. Whenever one of the contact pairs is closed by one of the metal bars 22, the stylus device receives an electric pulse which produces a mark on the recording tape. Consequently, a number of successive marks are thus recorded corresponding to the number of the metal bars of one of the groups, and these marks then form the above-mentioned parallel reference lines (4, 4a in FIG. 1) during the advancing motion of the paper tape. The width of the reference lines depends upon the relative position of the two contact ends of the individual pair of spring contacts. If the spring ends are relatively far from each other, then the duration of the individual marker pulse is long and the stylus writes a relatively wide reference line. However, if the spacing of the spring ends is slight, then the control circuit of the stylus is closed only momentarily and the reference line is correspondingly narrow.

When the cam 5 is being angularly displaced by displacement of the worm 10, the contact drum 21 is displaced simultaneously relative to the cyclical travel of the recording stylus so that the recording pulses caused by the metal bars 22 occur at earlier or later moments. This has the result that the reference lines that identify a given depth or distance, travel across the recording tape in the manner already explained.

During such travel no overlapping of the recorded reference lines can take place. This is because, as mentioned, the respective groups of metal bars are distributed over the periphery of contact drum 21 in such a manner that an angle of 60° obtains between each two adjacent groups. The width of the recording surface is a given integral fraction of the total length of cyclical stylus travel. For example, the width of the recording surface may be one-third of the total travel distance of the stylus. In the latter case, three contact pairs can successively act upon the stylus without overlapping of the recorded reference marks, and whenever a group of reference lines travels from above or below into the recording surface, another group of reference lines travels out of that recording surface. That is, as soon as the moment of pulse transmission is shifted so that the partial range being sounded exceeds the limit of the partial range identified by the largest or smallest group of the three groups of metal bars, the stepping mechanism 27 automatically displaces the slider 26 so that the proper next group of metal bars will enter into contact engagement with the contact springs.

If it is not desired to produce reference marks in the form of continuous lines because they may perhaps impair the clarity of the signal indication, the interrupter 29 may be actuated by opening the switch 29' (FIG. 8) with the effect that the stylus will produce the reference marks only in given intervals of time.

The control shaft 32, actuable by the manual control member 32a also carries a sprocket gear 40 (FIGS. 3, 9) which engages perforations of the film strip 3 in order to displace the scale marked on the film. By thus mounting the sprocket 40 on the control shaft 32 together with the pinion 31 and the stepping drum 27, any shift of the partial range being sounded is accompanied by a simultaneous displacement of the film scale and the simultaneous adjustment of the contact mechanism for producing the depth or distance-denoting reference lines. As a result, these component devices are always operative in the proper correlation to one another.

The above-described echo sounder operates as follows:

During operation of the recorder RE, the stylus 73 (FIGS. 1, 2, 8, 9) mounted on the moving endless belt or chain 74 travels periodically across the recording surface 1 at uniform speed. The cam 5 for releasing the transmitter pulses rotates at a constant speed which is predetermined by the transmission ratio of the gear transmission connecting the drive of the stylus through components 11a, 10, 9, 8 with the cam 5. During each full rotation of cam 5 it closes successively the contacts 6 and 7. The ratio of the speed of cam 5 to that of stylus 73 is such that the cam 5 completes one-half of a revolution for each individual passage of stylus 73 across the recording surface (vertically according to FIG. 8). Since the contacts 6 and 7 are 180° spaced from each other, cam 5 releases one transmitter pulse for each pass of stylus 73 across the recording surface.

Assume that the echo sounding operation is at first performed in the lowest portion of the total sounding range. Consequently, at the moment when a pulse is issued by the transmitter TR, this pulse, upon reaching the receiver RC, causes the recorder RE to indicate the zero signal. With this setting, the stepping mechanism 27 (FIGS. 4, 5, 9) opens the interrupter 28' (FIGS. 5, 8) which renders the contact pair 23 inactive so that only the contact pairs 24 and 25 remain capable of issuing pulses to the stylus. The zero pulse is thus directly entered on the recording surface by the amplified signal in proper relation to the echo signal received shortly thereafter.

If now the control shaft 32 (FIGS. 4, 9) is turned by means of the manual member 32a (FIGS. 1, 2, 4, 9), the pinion 32 meshing with the rack 20 displaces the worm 10 in the direction toward the spur gear 12, that is toward the left with reference to FIG. 3. At the same time the cam 5 is turned with the result that the time point at which the transmitter pulse is released by the cam 5 travels out of the above-defined recording area or range of the recording surface so that the zero echo no longer appears on the recording tape.

The switching drum 21 and its metal bars 22 (FIG. 5) are angularly displaced together with the cam 5. While, as mentioned above, the zero echo was still being recorded, the contact pair 25 became effective and caused the recording of a reference line 4, consisting of a single line, near the bottom of the recording surface, the spacing of the reference line from the zero signal line corresponding to a distance of 100 meters for example. Now, as soon as due to the above-mentioned angular displacement of cam 5 the zero-signal line travels upwardly out of the recording surface, the reference line 4 caused by contact pair 25 travels upwardly (FIGS. 1, 2) onto the surface of the recording tape 1. Analogously, if the depth or distance of the partial range being sounded increases, the single reference line, denoting a distance of 100 m., will ultimately travel upwardly out of the recording surface, and the next following reference line, formed of two parallel lines and produced by the contact springs 24, will travel from below the tape 1 (FIGS. 1, 2) onto the recording surface. Any such increase in sounding distance or depth is effected by turning the cam 5 with the aid of the manual member 32a and is accompanied by a stepwise displacement of the slider 26 so that ultimately the contact pair 23 can enter into contact with the group of four metal bars. Such stepwise displacement of slider 26, however, acts upon all three contact pairs simultaneously. Consequently, when the contact pair 23 is engageable with the four-bar group, the contact pair 25 is no longer engageable with the single-bar group but can now enter into contact with the two-bar group. This displacement of the depth-denoting reference lines 4 on the recording surface always occurs analogously to the displacement of the moment of pulse transmission and also to the displacement of the film scale 23 on top of the recording surface. The film scale thus permits reading the momentarily indicated echo soundings, whereas the entered reference lines 4 permit evaluating the recorded tapes at any later time. During the above-mentioned continuous displacement of the partial range being sounded, the partial range recorded always remains the same because it is dependent upon the width of the recording tape.

The partial range indicated on the picture screen of the cathode ray tube PC has a fixed size in terms of depth or distance and is displaceable relative to the cycle of stylus travel in the same manner as described above. The shifting of the sounding range to which the picture tube responds is effected by actuating the manual member 33a (FIGS. 1, 2, 4) acting through a pinion 34 upon the rack 35 which displaces the worm 15 and thus turns the cam 17. The displacement of the sounding range for the picture tube is independent of that of the recorded RE. The partial range indicated on the picture tube, therefore, can be directed to the main echo or to any subsidiary echoes or double echoes; and the shape apparent on the viewing screen 2 of the cathode ray tube then affords a conclusion as to cause of the echo, or of the type and shape of the object being tracked.

Figure 7:
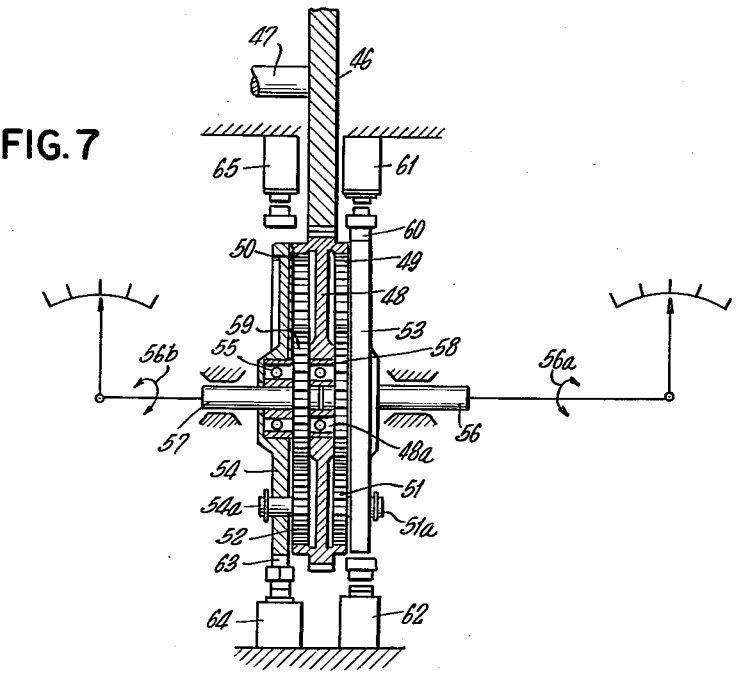

FIGS. 6 and 7 illustrate another gear mechanism for driving one or two cam discs in an echo sounder of the type described above, and in which one of the intermeshing gear members is adjustable for the purpose of angularly adjusting the cam discs so that the recurrent moment of pulse transmission or the triggering moment for the sweep generator of the cathode ray tube can be shifted with respect to the cyclical travel of the recorder. The transmission mechanism according to FIGS. 6 and 7 is generally of the differential type and is designed essentially as a planetary gearing.

The mechanism is driven by a spur gear 46 mounted on a shaft 47 mechanically connected with the stylus drive such as schematically indicated in FIG. 8 by the shaft connections 11a and 11b. The spur gear 46 (FIGS. 6, 7) meshes with exterior gear teeth of a rotatable orbit gear 48 which is journalled on a ball bearing 48a and thus is rotatable on two axially aligned shafts 56 and 57.

The shafts 56 and 57 form the respective control shafts of the device. They are stationarily journalled and are normally fixed during operation of the device. Each of shafts 56 and 57 is provided or connected with a manual control member corresponding to control member 32a or 33a in FIGS. 1, 2 and 4.

The orbit gear 48 has two circles of interior gear teeth 49 and 50 located on axially opposite sides respectively. Both interior circles of teeth mesh with respective planetary gears 51 and 52. The planetary gears are journalled on separately rotatable discs 53, 54 by means of a journal pin 51a and 54a respectively. The two discs 53 and 54 are seated on respective shafts 56 and 57 by means of ball bearings such as the one denoted by 55. Firmly mounted on shafts 56 and 57 are respective sun gears 58 and 59 in meshing engagement with the respective planetary gears 51 and 52. The fact that the shafts 56 and 57 are rotationally adjustable by manual control is schematically indicated by respective arrows 56a and 56b. Any angular adjustment of shaft 56 causes the sun gear 58 to be adjusted accordingly; and a change in adjustment of shaft 57 causes a corresponding change in the rotational position of the normally stationary sun gear 59.

Disc 53 carries a cam dog 60 for actuating two diametrically opposite contacts 61 and 62 for triggering the sweep generator of the cathode ray tube. Disc 54 carries a cam dog 63 for actuating two diametrically opposite switch contacts 64 and 65 for releasing the transmitter pulse.

The transmission ratio of the twin planetary gearing is 2:1. During each cyclical travel of the stylus in the recorder (RE in FIG. 8) the two cam discs 53 and 54 perform one-half of a full revolution. Consequently, during each cyclical travel of the stylus, only one transmitter pulse is released, and the sweep generator of the tube is triggered only once.

However, for taking echo soundings within a larger range, one of the contacts 64, 65 and also one of the contacts 61, 62 can be disconnected in the manner described above with reference to FIG. 8. This has the consequence that an individual echo sounding is taken only during each second cyclical travel of the recorder stylus.

By changing the rotational position of the control shaft 57 the normally stationary sun gear 59 is turned accordingly. The sun gear then drives the planetary gear 52 which travels along the inner gear teeth 50 of the orbit gear 48 and thus imparts an angular displacement to the cam dog 63 relative to the travel position of the recorder stylus. Consequently, the actuation of control shaft 57 causes a delay or advance of the transmitter pulse.

The other side of the planetary gearing operates analogously. A change in the rotational position of control shaft 56 causes a corresponding rotary displacement of sun gear 58 which drives the planetary gear 51 to roll along the inner gear teeth 49 of the orbit gear 48. Thus the dog of cam disc 53 is displaced relative to the correlated electric contacts and also relative to the travel position of the recorder stylus. The change in adjustment is such that the triggering of the sweep generator, effected by closing of one of the contacts 61, 62, will take place at an earlier or later moment relative to the recurrent moment of pulse transmission.

Consequently, the twin-type planetary gearing affords to continuously shift a partial range within the available total sounding range by shifting the recurrent moment of pulse transmission, and also permits selectively displacing the partial range of the magnified image appearing on the picture tube relative to the adjustable partial range recorded by the recorder. Consequently, when receiving several echoes, the response apparent from the recorder diagram can be more accurately identified by directing the response of the picture to only one of the plurality of recorded echoes.

It will be understood that aside from connecting the drive shaft 47 with the stylus drive, the planetary gearing according to FIGS. 6 and 7 can be coupled with a device for entering reference marks on the recording tape in the same manner as explained above with reference to FIGS. 1 to 5 and 8. Furthermore, the displacement of the sun gears 58 and 59 may be accompanied by displacing a film scale located above and transversely to the recording surface, also as described with reference to FIGS. 1 to 5 and 8.

It will be obvious to those skilled in the art that my invention permits of various other modifications and hence may be embodied in devices other than those particularly illustrated and described herein, without departing from the essential features of my invention and within the scope of the claims annexed hereto.

I claim:

1. Echo sounding apparatus, comprising electrosonic transducer means for transmitting and receiving sonic signals, a recorder electrically connected with said transducer means for recording received signals, said recorder having a surface member and a stylus cyclically movable across said surface member, a drive connected with said stylus for imparting cyclical motion thereto, pulse generator means electrically connected with said transducer means to supply transmitter pulses thereto and having a pulse releasing device for cyclically releasing pulses at an adjustable releasing moment relative to the cyclical travel of said stylus and within a selected portion thereof, a gear transmission comprising rotatable and intermeshing gear members connecting said pulse releasing device with said stylus drive for cyclically operating said releasing device in synchronism with the stylus motion, a first one of said gear members being continuously displaceable relative to another one of said gear members for adjusting said releasing moment of said releasing device relative to the cyclical travel of said stylus, and displacement control means connected with said first gear member.

2. Echo sounding apparatus according to claim 1, comprising a longitudinally displaceable film strip extending across said surface member and having a scale of distance-denoting indicia, and film displacing means engaging said film and connected with said displaceable gear member for displacing said film scale together with the shifting of said releasing moment, whereby said film scale is indicative of the range being sounded at a time.

3. Echo sounding apparatus according to claim 1, comprising electrically operated marking means connected with said stylus for controlling it to produce reference marks on said surface member, said marking means having a contact device for periodically issuing marker pulses to record reference marks indicative of given units of distance, and mechanical means connecting said contact device with said displaceable gear member, whereby said reference marks indicate the partial range being sounded at a time.

4. In echo sounding apparatus according to claim 1, said first one and said other one of said gear members forming respective input and ouput components of a planetary gearing which has a planet gear journalled on one of said two members and has a sun gear and an orbit gear in mesh with said planet gear, one of said sun and orbit gears constituting said other gear member, the remaining one of said sun and orbit gears being normally stationary, and said displacement control means being connected with said normally stationary gear for changing its position angularly about its axis.

5. Echo sounding apparatus according to claim 1, comprising electrically operated marking means connected with said stylus for controlling it to produce reference marks on said surface member, said marking means comprising a rotatable contact drum mechanically connected with said pulse releasing device to rotate in synchronism with the travel cycle of the stylus, said drum having groups of contact bars extending parallel to the drum axis, said groups having respectively different numbers of bars and being spaced from one another in the axial direction of the drum in non-overlapping relation, and a plurality of contact pairs non-rotatably mounted and spaced from each other in the axial direction of said drum, said contact pairs being engageable with said contact bar groups during rotation of said drum whereby each pair of contacts is temporarily closed by the bars of the engaged group to issue electric marker pulses to said stylus.

6. In echo sounding apparatus according to claim 5, each of said pairs of contacts being formed by leaf springs, and said leaf springs being displaceable relative to each other in the longitudinal direction of said springs.

7. Echo sounding apparatus according to claim 5, comprising a carrier on which said contact pairs are mounted, said carrier being displaceable axially of said drum for placing different members of said pairs into active position, a stepping mechanism connected with said carrier for incrementally displacing it, said stepping mechanism being connected with said displacement control means to effect displacement of said carrier in dependence upon the shifting of said recurrent pulse releasing moment.

8. Echo sounding apparatus according to claim 7, comprising an interrupter contact electrically connected with said contact pairs for inactivating them when said pulse releasing moment is so set relative to the cyclical stylus travel that the zero echo is recorded by said stylus, said interrupter contact being connected with said displacement control means to be actuated thereby in dependence upon a given positional range of said control means.

9. Echo sounding apparatus according to claim 7, comprising a worm gearing coaxially joined with said contact drum, a cam member driven from said worm gearing, a switch contact engageable by said cam member to be periodically actuated thereby, said switch contact being electrically connected with said contact pairs to inactivate them during recurrent intervals of time so that no reference marks are recorded during said intervals.

10. Echo sounding apparatus, comprising electrosonic transducer means for transmitting and receiving sonic signals, a recorder and a cathode ray tube both connected with said transducer means for response to received echo signals, said recorder having a surface member and a stylus cyclically movable across said surface member, a drive connected with said stylus for imparting cyclical motion thereto, pulse generator means electrically connected with said transducer means to supply transmitter pulses thereto and having a pulse releasing device, a sweep generator connected with said tube and having a sweep period shorter than the period of cyclical stylus motion for causing said tube to indicate a magnified partial sounding range out of the range recorded by said recorder, said sweep generator having a triggering device for releasing the tube operation, a gear transmission connecting said stylus drive with said pulse releasing device and with said triggering device at respective recurrent actuating moments for actuating said two devices in synchronism with the stylus motion, said transmission comprising between said drive and each of said two devices a set of two rotatable gear members of which one gear member is displaceable relative to the other for varying the recurrent actuating moments of said two respective devices independently of each other relative to the cyclical travel of said stylus, and displacement control means connected with said two displaceable gear members respectively.

11. In echo sounding apparatus according to claim 10, said two gear members forming respective input and output components of a differential-type gearing, one of said two members having a spur gear eccentrically journalled thereto and in mesh with said other gear member, said gearing further comprising a normally stationary gear coaxial to said two gear members and in mesh with said spur gear, and said displacement control means being connected with said normally stationary gear for changing its position angularly about its axis.

12. In echo sounding apparatus according to claim 10, said gear transmission comprising a planetary twin gearing assembly having an orbit gear connected with said stylus drive to be driven thereby, said orbit gear constituting one of said gear members and having two coaxial circles of interior gear teeth, two planet gears meshing with said respective teeth circles, two discs rotatable in coaxial relation to said orbit gear and constituting said other gear member, said planet gears being journalled on said respective discs to impart rotation thereto when said orbit gear is rotating, two coaxial and normally stationary sun gears meshing with said respective planet gears, each of said respective pulse releasing and sweep triggering devices having an electric contact and each of said discs having cam means for periodically actuating one of said contacts, and said displacement control means comprising two coaxially aligned control shafts connected with said respective sun gears for individually varying the rotary position thereof to thereby vary the recurrent actuating moments of said respective pulse releasing and sweep triggering devices.

13. In echo sounding apparatus according to claim 12, said two discs being rotatably mounted on said two coaxially aligned control shafts respectively.

14. Echo sounding apparatus, comprising electrosonic transducer means for transmitting and receiving sonic signals, a recorder electrically connected with said transducer means for recording received signals, said recorder having a recording tape longitudinally movable in a predetermined travel direction and having a stylus cyclically movable across said tape, a drive connected with said stylus for imparting cyclical motion thereto, pulse generator means electrically connected with said transducer means to supply transmitter pulses thereto, said pulse generator means having a pulse releasing device for cyclically releasing pulses at an adjustable releasing moment relative to the cyclical travel of said stylus and within a selected portion thereof, a mechanical transmission connecting said pulse releasing device with said stylus drive for cyclically operating said releasing device in synchronism with the stylus motion, said transmission comprising adjustable phase shift means for shifting said releasing moment of said releasing device relative to the cyclical travel of said stylus, a film strip extending on top of said record tape in a direction transverse to the tape travel and being displaceable in said latter direction, said film having a scale of distance-denoting indicia, and film displacing means engaging said film and connected with said phase-shift means for displacing said film scale together with the shifting of said releasing moment, whereby said film scale is indicative of the range being sounded at a time.

15. Echo sounding apparatus, comprising electrosonic transducer means for transmitting and receiving sonic signals, a recorder electrically connected with said transducer means for recording received signals, said recorder having a surface member and a stylus cyclically movable across said surface member, a drive connected with said stylus for imparting cyclical motion thereto, pulse generator means electrically connected with said transducer means to supply transmitter pulses thereto, said pulse generator means having a pulse releasing device for cyclically releasing pulses at an adjustable releasing moment relative to the cyclical travel of said stylus and within a selected portion thereof, a worm gear transmission having a worm connected with said stylus drive and a worm gear meshing with said worm and connected with said pulse releasing device for cyclically operating said releasing device in synchronism with the stylus motion, said worm being axially displaceable for thereby shifting the phase of said worm gear to said stylus motion to thereby shift said releasing moment of said releasing device relative to the travel cycle of said stylus, and displacement control means connected with said worm for axially displacing the latter.

16. Echo sounding apparatus, comprising electrosonic transducer means for transmitting and receiving sonic signals, a recorder and a cathode ray tube both connected with said transducer means for response to received echo signals, said recorder having a surface member and a stylus cyclically movable across said surface member, a drive connected with said stylus for imparting cyclical motion thereto, pulse generator means electrically connected with said transducer means to supply transmitter pulses thereto and having a pulse releasing device, a sweep generator connected with said tube and having a triggering device for releasing the tube operation, each of said releasing and triggering devices having contact means and a rotatable cam for periodically actuating said contact means at respective recurrent actuating moments, a gear transmission connecting said stylus drive with said two cams for rotating them in synchronism with the cyclical stylus motion, said transmission comprising two worms connected with said drive and two worm gears meshing with said respective worms and connected with said respective cams, each of said worms being axially displaceable independently of the other for shifting said recurrent actuating moments of said respective contact means relative to the travel cycle of said stylus.

17. Echo sounding apparatus according to claim 16, comprising two racks extending parallel to the axes of said respective worms and linked to said respective worms for imparting axial displacement thereto, respective pinions meshing with said racks, and manually operable control means connected with said pinion for rotating them.

18. Echo sounding apparatus according to claim 16, comprising two racks extending parallel to the axes of said respective worms and linked to said respective worms for imparting axial displacement thereto, respective pinions meshing with said racks, two manually rotatable control shafts on which said respective pinions are mounted, a longitudinally displaceable film strip extending across said surface member of said recorder and having a scale of distance-denoting indicia, film displacing means having a gear mounted on the one of said two control shafts that controls the shifting of said pulse releasing moment.

19. Echo sounding apparatus according to claim 16, comprising two racks extending parallel to the axes of said respective worms and linked to said respective worms for imparting axial displacement thereto, respective pinions meshing with said racks, two manually rotatable control shafts on which said respective pinions are mounted, electrically operated marking means connected with said stylus for controlling it to produce reference marks on said surface member of said recorder, said marking means comprising a contact device adjustable to different positions for issuing discriminating marker pulses whereby said reference marks have different appearance for denoting respectively different unit values of distance, a stepping mechanism for positionally controlling said contact device, said stepping mechanism having a control member mounted on the one of said two control shafts that controls the shifting of said pulse releasing moment.

20. Echo sounding apparatus according to claim 16, comprising two racks extending parallel to the axes of said respective worms and linked to said respective worms for imparting axial displacement thereto, respective pinions meshing with said racks and being mounted in coaxial relation to each other, a first control shaft coaxially connected with one of said pinions for varying its rotational position, and a hollow second control shaft coaxially surrounding said first control shaft, said other pinion being mounted in said hollow shaft to be rotationally adjusted thereby.

21. Echo sounding apparatus, comprising electrosonic transducer means for transmitting and receiving sonic signals, a recorder and a cathode ray tube both connected with said transducer means for response to received echo signals, said recorder having a surface member and a stylus cyclically movable across said surface member, a drive connected with said stylus for imparting cyclical motion thereto, pulse generator means electrically connected with said transducer means to supply transmitter pulses thereto and having a pulse releasing device, a sweep generator connected with said tube and having a triggering device for releasing the tube operation, each of said releasing and triggering devices having two electric contacts and a rotatable cam for periodically actuating said two contacts in equal intervals of time at respective recurrent actuating moments, a gear transmission connecting said stylus drive with said two cams for rotating them in synchronism with the cyclical stylus motion, said transmission comprising two worm gears of the same size connected with said respective cams and two worms of the same size meshing with said respective worm gears and geared together to be driven from said stylus drive at the same respective speeds of rotation, each of said worms being axially displaceable independently of the other for shifting said recurrent actuating moments of said respective cams relative to the travel cycle of said stylus.

22. Echo sounding apparatus according to claim 21, comprising two racks extending parallel to the axes of said respective worms and linked to said respective worms for imparting axial displacement thereto, respective pinions meshing with said racks and rotationally displaceable for shifting said racks and worms, each of said racks having contact means mounted thereon and electrically connected with a respective one of said two contacts, whereby said contact means inactivate said one contact when said rack passes through a given position.

References Cited in the file of this patent
UNITED STATES PATENTS

| | | |
|---|---|---|
| 2,309,956 | Hughes | Feb. 2, 1943 |
| 2,610,244 | Wolf | Sept. 9, 1952 |
| 2,788,509 | Bolzmann | Apr. 9, 1957 |
| 2,892,666 | Parker et al. | June 30, 1959 |
| 2,925,580 | Schumacher | Feb. 16, 1960 |